(12) United States Patent
Stark

(10) Patent No.: US 6,564,629 B2
(45) Date of Patent: May 20, 2003

(54) THERMAL FLOWMETER

(75) Inventor: Hartmut Stark, Stockelsdorf (DE)

(73) Assignee: Drägerwerk Aktiengesellschaft (DE)

( * ) Notice: Subject to any disclaimer, the term of this patent is extended or adjusted under 35 U.S.C. 154(b) by 0 days.

(21) Appl. No.: 10/025,737

(22) Filed: Dec. 19, 2001

(65) Prior Publication Data

US 2002/0139184 A1 Oct. 3, 2002

(30) Foreign Application Priority Data

Mar. 29, 2001 (DE) .......................................... 101 15 624

(51) Int. Cl.⁷ ................................................ G01F 1/68
(52) U.S. Cl. ................................................. 73/204.27
(58) Field of Search ...................... 73/292, 295, 204.27, 73/204.24, 204.17, 204.11, 204.13, 204.23

(56) References Cited

U.S. PATENT DOCUMENTS

| | | | |
|---|---|---|---|
| 3,181,357 A | | 5/1965 | Benson |
| 5,119,674 A | * | 6/1992 | Nielsen ................. 73/204.17 |
| 5,178,009 A | * | 1/1993 | Arekapudi et al. ......... 137/389 |
| 5,677,484 A | * | 10/1997 | Stark ...................... 73/170.12 |

FOREIGN PATENT DOCUMENTS

| | | |
|---|---|---|
| DE | 31 12 144 A1 | 3/1981 |
| DE | 195 01 347 C2 | 1/1995 |

* cited by examiner

*Primary Examiner*—Hezron Williams
*Assistant Examiner*—Jewel V. Thompson
(74) *Attorney, Agent, or Firm*—McGlew and Tuttle, P.C.

(57) ABSTRACT

A device for measuring the flow of a fluid located in a fluid channel heats the fluid channel without additional components. A metallic tube (2) with predetermined thermoelectric potential is provided as a fluid channel. An a.c. power source (7) is connected to a partial section (6) of the tube (2) in such a manner that the partial section (6) is heated as a resistor element to an increased working temperature compared with the temperature of the fluid. At least one thermocouple (12) is provided with junction points formed along the partial section (6) in such a manner that at least two wires (8, 9) with another thermoelectric potential are connected to the tube (2) in the area of the partial section (6). A measuring circuit (13, 14, 15) evaluates the thermocouple voltage of the thermocouple (12) and has a circuit (13) which eliminates the a.c. voltage component superimposed to the thermocouple voltage as a consequence of the a.c. heating. The thermocouple voltage yields the measured variable corresponding to the flow.

20 Claims, 2 Drawing Sheets

THERMAL FLOWMETER

FIELD OF THE INVENTION

The present invention pertains to a device for measuring the flow of a fluid flowing in a fluid channel.

BACKGROUND OF THE INVENTION

Thermal flow measurement methods have been known in which thermocouples are used to determine the transport of heat.

A device for measuring the flow by means of a thermocouple has become known from DE 195 01 347 C2. The junction points of the thermocouple are arranged one behind another in a fluid channel and are heated to an increased working temperature compared with the temperature of the fluid by means of an a.c. power source. The voltage of the thermocouple, which is obtained during the flow through the fluid channel from the difference in the cooling of the junction points, is used as the measured variable. The a.c. voltage components, which are superimposed to the thermocouple voltage due to the a.c. heating of the thermocouple, are eliminated by a circuit.

The drawback of the prior-art device is that the junction points are located directly in the fluid channel and are subject to different stresses. Thus, there is a risk that the junction points are damaged by foreign bodies in the fluid, or increased corrosive effects occur in the case of corrosive media, because the junction points consist of different materials for design reasons.

A thermal flowmeter with a thermocouple, in which the fluid channel consists of a heated, metallic tube section, has been known from DE 31 12 144 A1. The junction points of the thermocouple are formed at the ends of the tube sections by different material pairs between the lead wires and the tube material. Both the tube section and the junction points are heated to an increased working temperature compared with the temperature of the fluid by means of a heating section located on the tube section in the form of a plurality of film resistors. The drawback of the prior-art device is that a separate heating element is needed for heating up the tube section.

SUMMARY AND OBJECTS OF THE INVENTION

The basic object of the present invention is to improve a device of the above-mentioned type such that the heating of the fluid channel is possible without additional components and the thermocouple is arranged in a protected manner.

According to the invention, a device for measuring the flow of a fluid located in a fluid channel is provided. The device includes a metallic tube of a predetermined thermoelectric potential as a fluid channel. An a.c. power source is connected to a partial section of a tube in such a manner that the partial section is heated as a resistor element to an increased working temperature compared with the temperature of the fluid. At least one thermocouple is provided with junctions formed in the area of the partial section in such a manner that at least two wires with another thermoelectric potential are connected to the tube. A measuring circuit evaluates the thermocouple voltage of the thermocouple. The measuring circuit includes a circuit which eliminates the a.c. voltage component superimposed to the thermocouple voltage as a consequence of the a.c heating. The thermocouple voltage yields the measured variable corresponding to the flow.

The advantage of the present invention is essentially that, on the one hand, the thermoelectric potential of the lead wires is adjusted to the thermoelectric potential of the tube material due to the use of a metallic tube in combination with lead wires such that the junction points of the thermocouple are formed directly at the contact points between the lead wires and the tube material and that, on the other hand, the tube can be brought to the working temperature together with the junction points due to the fact that the tube is directly integrated in an electric circuit, which is connected to an a.c. power source. The partial section of the tube that is connected to the a.c. power source now acts as a resistor element, which is heated by the a.c. power source. Another advantage is that the tube section heated in this manner can be adapted to different requirements in an especially simple manner by using tube sections of different length for the heating depending on the particular application. As a result, different measurement ranges can be obtained for the flow measurement in an especially simple manner. By contrast, the tube sections according to the state of the art must be provided individually with correspondingly adapted film resistors in the case of prior-art tube sections of different length in order to achieve a uniform heating. Temperature gradients between the film resistors or between the film resistors and the junction points cannot always be avoided because only a punctiform heating of the tube section is possible by means of individual film resistors.

The device according to the present invention is not limited to the flow measurement of a particular fluid. The device according to the invention is also suitable generally for the flow measurement of gases and liquids.

It is advantageous to arrange the junction points within the heated partial section of the tube. If, e.g., a larger partial section of the tube is heated, favorable distances can be experimentally determined for the junction points within the partial section. The junction points are preferably arranged in the area of the ends of the partial section. The junction points can thus also be located outside the partial section.

It is particularly advantageous to use the wires that lead to the junction points as the power lead for the a.c. power source. As a result, only two contacts must be established to the tube.

The suitable material pairs between the tube and the wires are selected from the group of the materials chromel/constantan, copper/constantan and iron/constantan.

An exemplary embodiment of the present invention is shown in the figure and will be explained in greater detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
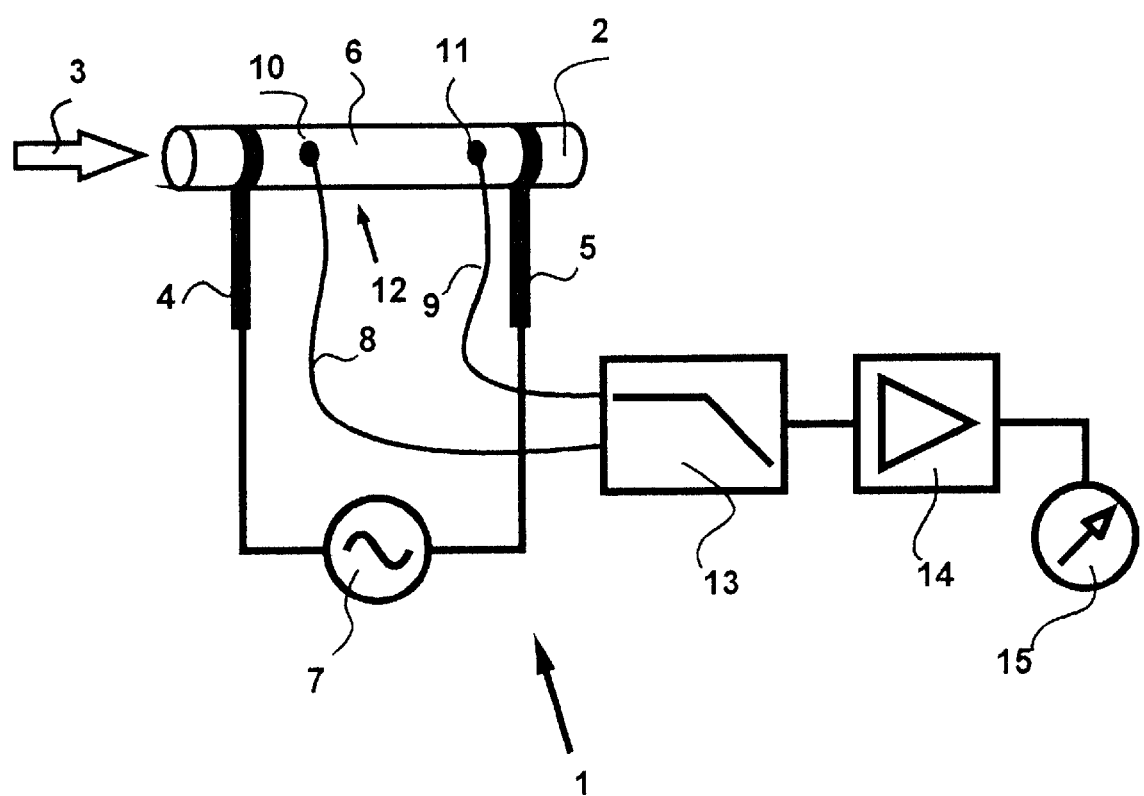
FIG. 1 is a schematic view showing a first measuring device.

Referring to the drawings in particular, FIG. 1 schematically shows a first measuring device 1, in which a gas flows through a thin-walled tube 2 consisting of constantan in the direction of an arrow 3. The tube 2 is divided by contact tongues 4, 5 into a partial section 6. The partial section 6 is heated to an increased working temperature, compared with the temperature of the fluid (e.g., gas) by means of an a.c. power source 7. The partial section 6 of the tube 2 acts like a resistor element, through which current flows. Within the partial section 6, two wires 8, 9 consisting of copper are welded at junction points 10, 11 to the tube 2. A thermocouple 12 has a thermocouple voltage sent to a display device 15 via a low-pass filter 13 and an amplifier 14. The thermocouple 12 is formed at the junction points 10, 11 due to the different thermoelectric potential between the tube 2 consisting of constantan and the wires 8, 9 consisting of copper. The cut-off frequency of the low-pass filter 13 is selected to be such that the a.c. voltage component, which is caused by the a.c. power source 7 and is superimposed to the thermocouple voltage, is filtered out, so that only the amplified thermocouple voltage will reach the display device 15. The measuring effect in the first measuring device 1 is based on the fact that the junction points 10, 11 are cooled at different intensities during the flow through the tube 2 and a thermocouple voltage, which depends on the value of the flow, becomes established between the junction points 10, 11 because of the temperature difference. It is essential in the first measuring device 1 that the heating of the tube is carried out by means of alternating current because the heating with a direct current would be superimposed to the thermocouple voltage, without the heating current being able to be eliminated by means of a filter.

Figure 2:
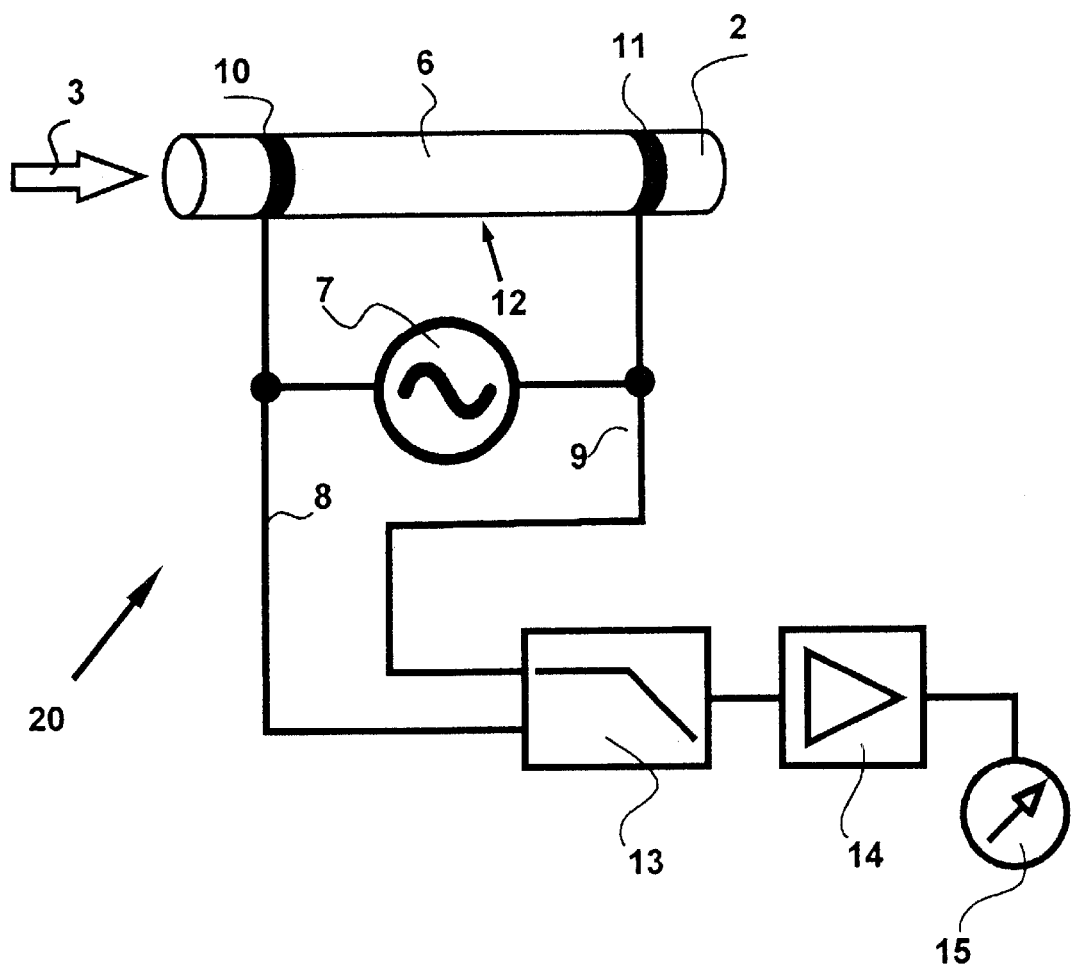
FIG. 2 is a schematic view showing schematically shows a second measuring device.

A second measuring device 20 shown in FIG. 2 differs from the first measuring device 1 shown in FIG. 1 in that the a.c. power is supplied directly via the wires 8, 9 and thus via the junction points 10, 11. The partial section 6 corresponds here to the distance between the junction points 10, 11. Identical components are designated by the same reference numbers as in FIG. 1. The second measuring device 20 is especially suitable for printed circuit board assembly, because the junction points 10, 11 can be formed by directly soldering the tube 2 to the strip conductors of the printed circuit board, which consist of copper.

While specific embodiments of the invention have been shown and described in detail to illustrate the application of the principles of the invention, it will be understood that the invention may be embodied otherwise without departing from such principles.

What is claimed is:

1. A device for measuring the flow of a fluid located in a fluid channel, the device comprising: a metallic tube of a predetermined thermoelectric potential, the metallic tube being connected to form a part of the fluid channel, the metallic tube including a partial section; an a.c. power source connected to the partial section of the tube heating the partial section as a resistor element to an increased working temperature compared with the temperature of the fluid; at least one thermocouple including junctions formed in an area of the partial section and wires, with another thermoelectric potential, connected to the tube; a measuring circuit for evaluating a thermocouple voltage of the thermocouple with a circuit for eliminating the a.c. voltage component superimposed to the thermocouple voltage as a consequence of the a.c. heating the thermocouple voltage providing a measured variable corresponding to the flow.

2. A device in accordance with claim 1, wherein the junction points are arranged within the partial section.

3. A device in accordance with claim 1, wherein the junction points are arranged outside the partial section.

4. A device in accordance with claim 1, wherein the a.c. power source is connected to the tube via the wires acting as a power lead.

5. A device in accordance with claim 1, wherein the material pair between the tube and the wires is selected from the group of the materials chromel/constantan, copper/constantan and iron/constantan.

6. A device according to claim 1, wherein the thermocouple junctions are connected to an exterior of the partial section.

7. A device according to claim 1, wherein the thermocouple junctions form a part of the partial section.

8. A device according to claim 1, wherein the thermocouple junctions are formed directly at contact points between the wires and the tube material of partial section of the metallic tube.

9. A device for measuring the flow of a fluid located in a fluid channel, the device comprising:

a metallic tube of a predetermined thermoelectric potential, the metallic tube being connected to form a part of the fluid channel, said metallic tube including a partial section;

an a.c. power source connected to said partial section of said metallic tube, said partial section being heated as a resistor element to an increased working temperature compared with the temperature of the fluid by said a.c. power source;

at least one thermocouple including junctions formed in an area of the partial section and wires with thermoelectric potential different from said metallic tube;

a measuring circuit for evaluating a thermocouple voltage of the thermocouple and for eliminating the a.c. voltage component superimposed to the thermocouple voltage as a consequence of the a.c. heating, the thermocouple voltage providing a measured variable corresponding to the flow.

10. A device in accordance with claim 9, wherein said junctions are arranged within said partial section.

11. A device in accordance with claim 9, wherein said junctions are arranged outside said partial section.

12. A device in accordance with claim 9, wherein said a.c. power source is connected to said metallic tube via said wires, said wires forming a power lead.

13. A device in accordance with claim 9, wherein a material pair of said thermocouple junctions between said metallic tube and said wires is selected from the group of the materials chromel/constantan, copper/constantan and iron/constantan.

14. A device according to claim 9, wherein the thermocouple junctions are connected to an exterior of the partial section.

15. A device according to claim 9, wherein the thermocouple junctions form a part of the partial section.

16. A device according to claim 9, wherein the thermocouple junctions are formed directly at contact points between the wires and the tube material of partial section of the metallic tube.

17. A method for measuring the flow of a fluid located in a fluid channel, the device being formed by the steps of:

providing a fluid channel with an interruption region;

providing a metallic tube of a predetermined thermoelectric potential;

connecting the metallic tube to the fluid channel at the interruption to form a part of the fluid channel;

connecting an a.c. power source to a partial section of the tube;

heating the partial section as a resistor element to an increased working temperature compared with the temperature of the fluid;

forming at least one thermocouple including forming junctions in an area of the partial section and wires, with another thermoelectric potential, connected to the tube;

connecting a measuring circuit to the thermocouple, for evaluating a thermocouple voltage of the thermocouple with a circuit for eliminating the a.c. voltage component superimposed to the thermocouple voltage as a consequence of the a.c. heating, the thermocouple voltage providing a measured variable corresponding to the flow.

18. A method in accordance with claim 17, wherein the material pair between the tube and the wires is selected from the group of the materials chromel/constantan, copper/constantan and iron/constantan.

19. A method according to claim 17, wherein said step of forming at least one thermocouple includes forming the thermocouple junctions as part of the fluid channel, either integral with the partial section or adjacent to the partial section.

20. A method in accordance with claim 17, wherein the step of forming junctions in an area of the partial section and wires includes forming thermocouple junctions directly at contact points between the lead wires and the tube material of partial section of the metallic tube.

* * * * *